United States Patent
Koini et al.

(10) Patent No.: US 6,580,046 B1
(45) Date of Patent: Jun. 17, 2003

(54) PROCESS AND CONFIGURATION FOR THE AUTOMATED CONVEYING, SORTING AND LOADING OF BAGGAGE ITEMS

(75) Inventors: Martin Koini, Sörth (DE); Gunar Baier, Mannheim (DE)

(73) Assignee: ABB Patent GmbH, Ladenburg (DE)

( * ) Notice: Subject to any disclaimer, the term of this patent is extended or adjusted under 35 U.S.C. 154(b) by 27 days.

(21) Appl. No.: 09/621,435

(22) Filed: Jul. 21, 2000

(30) Foreign Application Priority Data

Jul. 21, 1999 (DE) .......................................... 199 34 095

(51) Int. Cl.[7] .............................. B07C 5/00; G06F 17/00
(52) U.S. Cl. ...................... 209/564; 209/583; 209/645; 209/933; 700/226; 235/375; 235/384
(58) Field of Search ................................ 209/559, 563, 209/564, 583, 933, 645, 586; 700/226; 235/375, 384

(56) References Cited

U.S. PATENT DOCUMENTS

| | | | | |
|---|---|---|---|---|
| 3,695,462 A | * | 10/1972 | Sullivan | 198/350 X |
| 5,627,517 A | * | 5/1997 | Theimer et al. | 340/572 |
| 5,793,639 A | * | 8/1998 | Yamazaki | 700/226 |
| 6,108,636 A | * | 8/2000 | Yap et al. | 705/5 |

* cited by examiner

Primary Examiner—Tuan N. Nguyen
(74) Attorney, Agent, or Firm—Laurence A. Greenberg; Werner H. Stemer; Gregory L. Mayback

(57) ABSTRACT

A process is provided for the automated conveying, sorting and loading of baggage items in airports having a baggage-conveying facility conveying baggage from a check-in region to a baggage area, from where they are transported for loading into aircraft. In a first step, a flight destination and travel class as well as weight, shape, volume and consistency of each baggage item are recorded and registered. In a second step, the recorded baggage data are entered into a computer system (packing computer) which divides the baggage items into predetermined classes and determines optimum assignment to loading devices in accordance with classification and flight destination. In a third step, the baggage items handled in this way are transported to loading stations for loading in accordance with the defined assignment and, in a fourth step, are loaded there into a loading device essentially in an automated manner. A configuration which is suitable for implementing the process is also provided.

20 Claims, 3 Drawing Sheets ary applications, for example loading packages onto
PROCESS AND CONFIGURATION FOR THE AUTOMATED CONVEYING, SORTING AND LOADING OF BAGGAGE ITEMS

BACKGROUND OF THE INVENTION

Field of the Invention

The invention relates to a process and a configuration for the automated conveying, sorting and loading of baggage items in facilities which have a baggage-conveying facility that conveys the baggage from a check-in region to a baggage area, from where it is transported for loading into transporting vehicles.

The automated conveying and sorting of baggage items has already been realized in facilities such as a large number of relatively large airports. Those facilities serve for transporting baggage items from various charging locations, for example a check-in region, specifically relating to flight number and travel class, to corresponding loading stations. In that case, the baggage items are manually reloaded into a suitable loading device, such as carts or containers, for transportation to the aircraft.

The transportation of the baggage items is carried out in that case by conveying equipment such as conveying belts, shell-type transporting systems (endless belt with transporting shells joined to one another) or guided vehicles.

Manual or automated baggage-data recognition in accordance with flight destination, airline and travel class takes place for sorting the baggage in such a system. The corresponding data is retained on data carriers, usually bar-coded paper strips, fastened on the respective baggage item.

Furthermore, the individual baggage items are spatially separated from one another within the conveying facility so as to ensure that the baggage item can be clearly tracked during transportation. In facilities with conveying belts, that takes place by ensuring a minimum distance between the baggage items, and otherwise by assigning the baggage item to a defined element, for example a shell or carriage, of the conveying equipment.

The destination of the baggage items in the facility is a loading station. In that case, they are assigned to certain flights, as well as connecting-flight destinations and/or travel classes as appropriate.

Within the automating system of the facility, the information regarding baggage items and the whereabouts thereof in the facility are combined with the destination and converted into control commands for the facility. The baggage items are transported to the corresponding loading station and discharged there.

The essential technical embodiments and processes brought in nowadays are set out comprehensively in publications entitled "Airport Development Reference Manual" and "Passenger Services Conference Resolutions Manual" from IATA.

However, all of the known processes and systems only concern the transportation and sorting of the baggage items. Loading takes place manually and does not form part of the automated transporting process.

Previous attempts to automate that process step as well have failed since it has not been possible to set out suitable solutions, in conjunction with the above-described handling process, for the wide range of baggage items which are to be handled.

The solutions which have already been realized in other industrial applications, for example loading packages onto pallets, cannot be adopted since the solutions developed there, for example robots with specific gripping tools, can only be used in each case for very limited ranges of shapes, structures and dimensions, etc.

A considerable disadvantage of the known configurations and processes is that the loading of the baggage items onto the transporting device for further transportation to the aircraft takes place manually. On one hand, that requires a large number of operators and thus high costs during the loading operation and, on the other hand, manual loading is very physically strenuous for those involved. Furthermore, the manual aspect means that there is a considerable risk of incorrect loading as well as theft.

A replacement of manual loading by an automated station, for example with robots or loading apparatuses, for maintaining the current processes and configurations for transporting and sorting, cannot be realized for practical usage due to the limitations in handling technology and the large range of baggage items which are to be handled.

SUMMARY OF THE INVENTION

It is accordingly an object of the invention to provide a process and a configuration for the automated conveying, sorting and loading of baggage items, which overcome the hereinafore-mentioned disadvantages of the heretofore-known processes and configurations of this general type and which allow automation of the transporting, sorting and loading process.

With the foregoing and other objects in view there is provided, in accordance with the invention, a process for the automated conveying, sorting and loading of baggage items in airports having a baggage-conveying facility conveying the baggage from a check-in region to a baggage area, from where it is transported for loading into aircraft, which comprises in a first step, recording and registering data including flight destination, travel class, weight, shape, volume and consistency for each baggage item; in a second step, entering or analyzing the recorded baggage data into a computer system (packing computer) dividing the baggage items into predetermined classes and determining an optimum assignment to loading devices in accordance with classification and flight destination, as well as a corresponding loading scheme for the individual loading device; in a third step, bringing the baggage items to loading stations for loading in accordance with the assignment by feeding loading devices, in accordance with a loading sequence, to the individual loading stations with an automatic transporting system; and in a fourth step, substantially automatically loading the baggage items into the loading devices with robots and gripping tools and/or mechanical loading apparatuses, by transporting the baggage items classified in this way for loading, in a sequence necessary for the loading operation, according to the defined assignment to loading stations.

The essence of the invention is thus the novel configuration of the baggage-handling process for airports which have been equipped, or will be equipped, with an automated baggage-conveying facility. In this case, the sorting of the baggage items and the assignment thereof to the loading stations takes place not, as is the case currently, in accordance with flight destination and, if appropriate, travel class, but additionally in accordance with the baggage type or the handling equipment suitable for the specific baggage item.

On one hand, this makes it possible for only baggage of a certain classification to be fed to the loading stations automated according to the invention. On the other hand, however, this also means that the loading devices, such as containers and carts, which are assigned to a certain flight, and assume the task of transportation from the baggage facility to the respective aircraft, have to be loaded with baggage at various loading stations.

The process according to the invention for baggage handling and the developments thereof accordingly include the following steps:

1. Automated recording of the baggage properties, that is to say, in addition to the associated passenger, the flight destination and the travel class, as well as weight, shape, volume and consistency of the baggage item.

Transmission of the baggage data to part of the computer system ("packing computer"), which divides the baggage items into predetermined classes. The computer system additionally performs:

2. Determination of optimum assignment to the loading device in accordance with classification and flight destination. The optimization takes place in this case both in relation to the highest possible packing density of the loading device and in relation to a loading sequence which treats the individual baggage items as carefully as possible. Thus, for example, heavy and hard parts are loaded first of all, while flexible and lightweight parts are then stacked thereon.

3. Assignment of the baggage items and of the loading device to certain loading stations, in accordance with the baggage classification and the packing and/or stacking planning according to Step 2 and in accordance with the flight destination. In this case, the baggage items assigned to a loading station may have various flight destinations, but always belong to a certain baggage class. The assignment takes place in a further part of the computer system ("sorting computer"), which also assumes the task of transferring data to the automating system of the baggage-conveying facility.

4. Sorting and transporting the baggage items to the respective loading stations.

5. Transporting the loading devices to the respective loading stations and loading the baggage items within the loading stations assigned to them. Automated, semi-automated or manual loading stations may be used for this purpose, depending on the baggage class.

In accordance with another mode of the invention, it is particularly important in this case that the recording of the volume and of the contour of the baggage items and of the consistency takes place automatically without anyone being involved.

In accordance with a further mode of the invention, the data relating to destination of the baggage item and the properties thereof such as weight, volume, shape and consistency are advantageously recorded and stored during check-in of the relevant passenger. The recorded data are stored directly in the computer of the baggage-conveying facility or on data carriers which are provided on the baggage items and, during passage through the loading path, are automatically detected by optical or electronic reader units provided for this purpose, in order to control the loading operation.

In accordance with an added mode of the invention, the loading operation of the baggage items is monitored with the aid of optical image-recognition systems through the use of which the respective position of the baggage items is detected and corrected, if required, with the aid of mechanical tools, for example gripping tools. The respective position of the baggage items is indicated by the image-recognition system if required, in particular with the occurrence of disruptions, and, with the aid of three-dimensional visualization, the use of the mechanical tools, for example gripping tools, is controlled by an operator in order to eliminate the disruptions indicated.

With the objects of the invention in view, there is also provided a configuration for the automated conveying, sorting and loading of baggage items, in an airport including a check-in region, a baggage area and a baggage-conveying facility conveying baggage from the check-in region to the baggage area to be transported for loading into aircraft. The baggage-conveying facility has at least one supply station, at least one collecting station, at least one loading station, a conveying device and a control device. The configuration comprises a computer system connected to the baggage-conveying facility for controlling movement of the conveying device and the control device, and a device disposed in the vicinity of the supply station. The device records data including automatically determined characteristic variables of supplied baggage items, such as weight, shape, volume and consistency, as well as flight destination and travel class. The device makes the data available to the computer, and the device controls transportation of the baggage items to an associated loading station in accordance with the respective data.

In accordance with another feature of the invention, there are provided automated loading tools, for example robots and/or gripping tools.

In accordance with a concomitant feature of the invention, there is provided an automated transporting apparatus for the transfer of the loading devices to the loading stations.

Other features which are considered as characteristic for the invention are set forth in the appended claims.

Although the invention is illustrated and described herein as embodied in a process and a configuration for the automated conveying, sorting and loading of baggage items, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
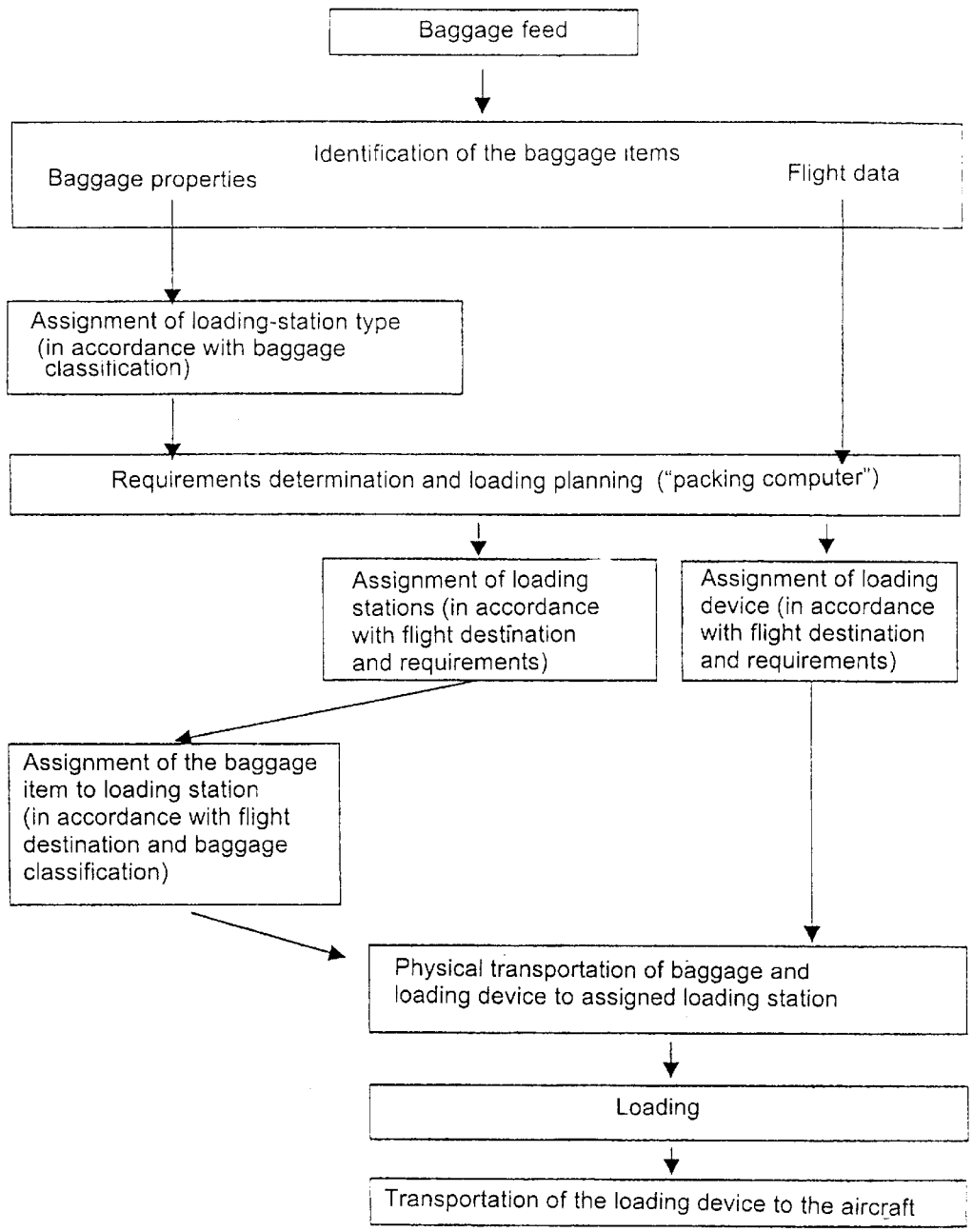
FIG. 1 is a flow diagram for a process according to the invention.

Referring now to the figures of the drawings in detail and first, particularly, to FIG. 1 thereof, there is seen a flow diagram which schematically specifies a process sequence according to the invention, that is set out in a largely self-explanatory manner and can be understood in conjunction with that which has been explained above and with that which will be explained below.

Figure 2:
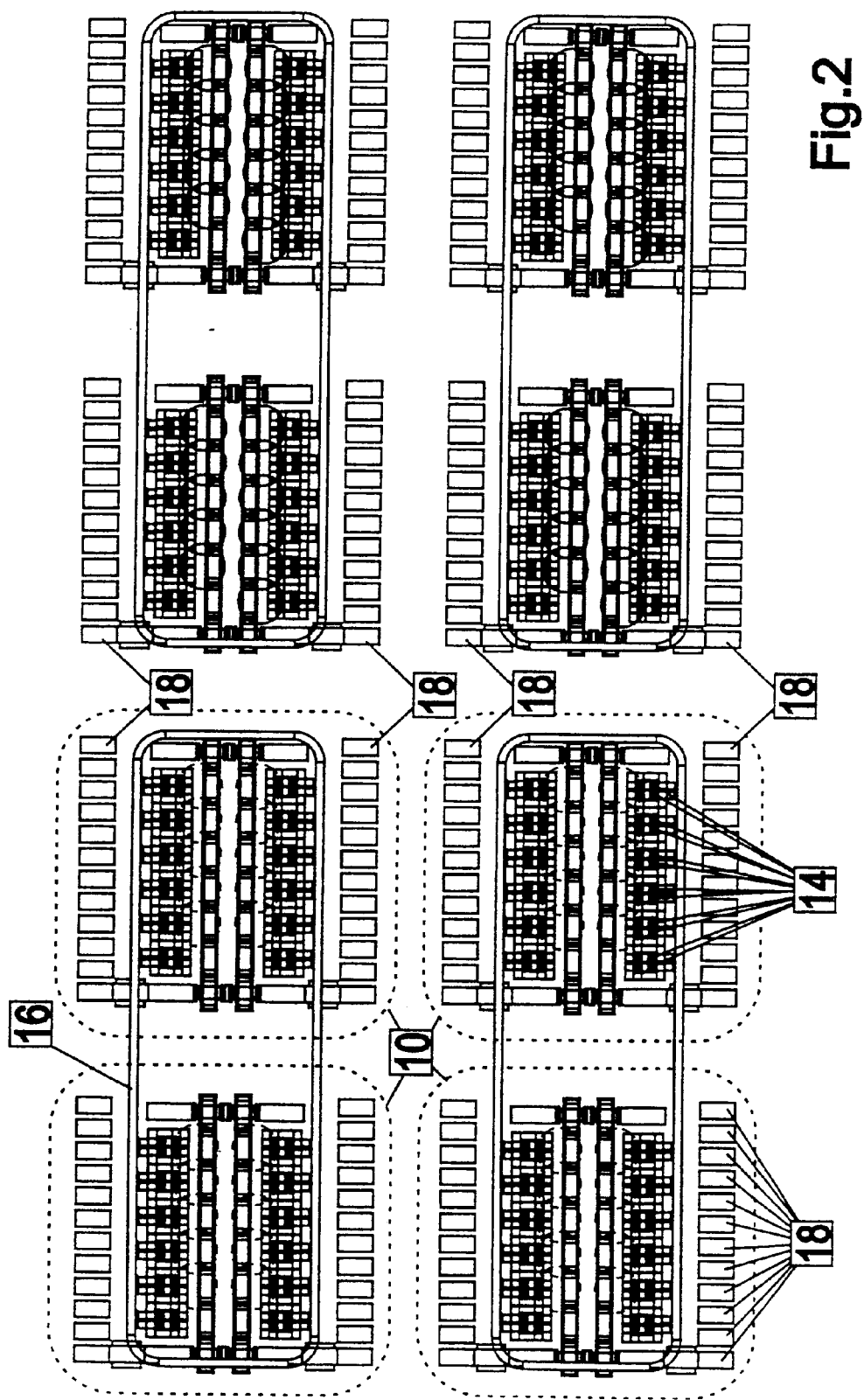
FIG. 2 is a diagrammatic, overall plan view of a baggage-conveying facility according to the invention with island-like loading stations.
Figure 3:
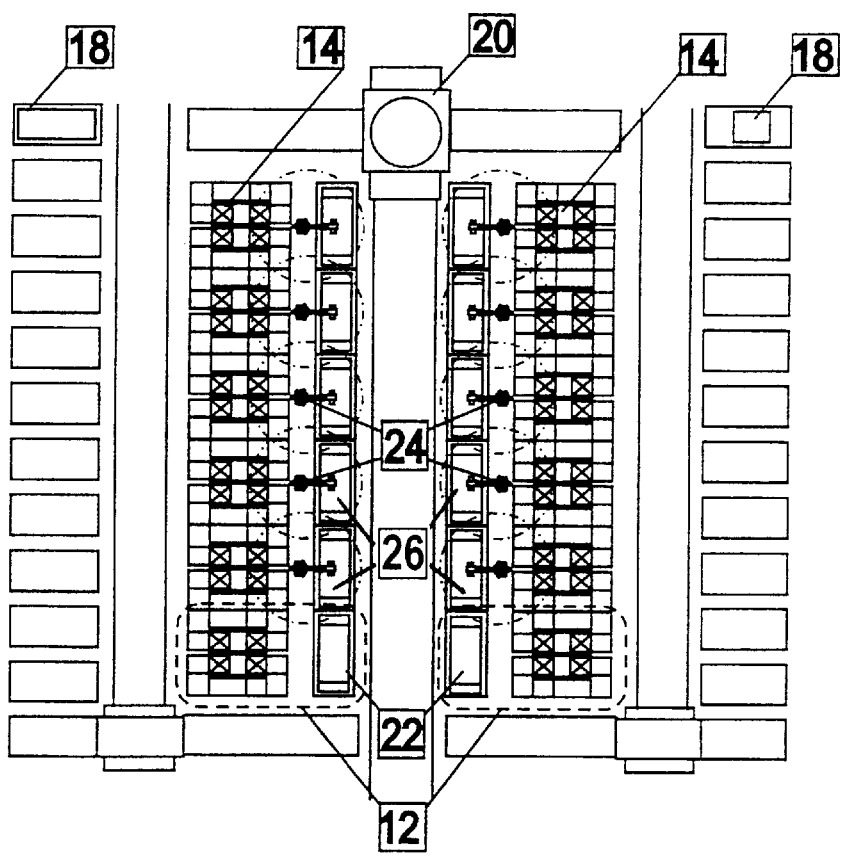
FIG. 3 is an enlarged plan view of an individual island-like loading station of FIG. 2 with robots.

FIGS. 2 and 3 show an exemplary embodiment of a baggage-conveying facility through the use of which the above-described process can be realized. In this case, the drawing shows only that part of the configuration which is essential for automated loading since the conveying technology otherwise corresponds to known configurations from current systems.

FIG. 2 shows individual loading regions 10, which are referred to as loading islands, which form individual loading stations and which are disposed one beside the other. It is seen in FIGS. 2 and 3 that the loading islands 10 each have handling stations 12, dynamic intermediate storage devices 14 for baggage items, baggage feed devices 16 and loading devices 18, for example containers, wagons, cars or carts, which interact with a transporting system for a loading device 20.

FIG. 3 illustrates an individual loading island 10 which, for example, has two loading locations 22 for manual loading and, in the example shown, ten main loading locations 26 provided with loading robots 24. The rest of the features have already been shown in FIG. 2 and explained in relation to the same. Accordingly, the facility essentially includes the following sub-systems with respectively specified individual functions:

Baggage feeding from a check-in region or transfer baggage charging with conventional technology.

Baggage sorting and baggage transportation:
The mechanical execution takes place in accordance with the prior art. Essential innovations according to the invention relate to additional measures and equipment for baggage identification and baggage classification, such as measuring and computer systems.

The baggage properties may be recorded in this case through various measuring equipment. The selection of the measuring device being used is irrelevant for the execution of the process according to the invention. All that is necessary is for it to be possible for the essential properties characterizing the baggage item to be reliably recorded and fed to the computer system.

These properties are:
Flight Destination and Travel Path
The recordation of the flight destination and travel path takes place by entering the data manually or in an automated manner during check-in in accordance with the prior art. In this case, the data either may be entered directly into the computer system of the baggage-conveying facility or they are transferred to storage media which are then read out within the baggage-conveying facility. In the current prior art, that takes place by using so-called baggage tags (bar-coded paper strips) which are read out optically. Therefore, according to the invention, it is also possible to use radio-frequency transponders for this purpose, in which a relatively large number of data can be registered and to which it is also possible, to some extent, to write subsequently. This technology envisaged for the process according to the invention allows a considerable improvement in data management, but is not absolutely necessary for realizing the invention.

Weight
The weight can be recorded both during check-in and by weighing scales integrated in the conveying facility.

Volume/contour
The measurement of the volume and contour of baggage items can take place in two ways, namely through the use of optical systems, for example by a configuration of light emitters and light detectors and/or by evaluation of an image-recognition system, or through the use of X-ray, by additionally using units used for safety checking of the baggage for detecting the contour and the volume of the baggage items.

Consistency
In order to determine consistency, that is to say essentially checking the surface properties of the baggage items for the following criteria: hard/flexible, smooth/rough, flat/textured, etc., it is envisaged to use a combination of measuring equipment, for example tactile sensors, image-recognition processes and determination of chemical composition through the use of X-ray analysis.

Loading Stations
The loading stations essentially include three sub-systems: Dynamic intermediate storage devices for the transfer of the baggage between the transporting system and the handling equipment.

This sub-system is not absolutely necessary for the process of the invention described herein, but is expedient if the process is to be used in baggage-conveying facilities in which a high throughput is required. A possible realization thereof is set out in German Published, Non-Prosecuted Patent Application DE 199 31 756 A1.

Handling Equipment for Loading the Baggage into the Loading Device
The loading takes place in a fully automated or semi-automated manner, depending on baggage category. Purely manual loading locations also have to be provided for exceptional cases (outsized or very fragile baggage items). The (semi-) automated handling equipment may be realized, for example, by the use of robots. Depending on the baggage category, they are provided with corresponding gripping tools, for example suction grippers, mechanical grippers, etc. The robots are expediently used with exchangeable grippers, as a result of which various gripping tools can be used at one station and greater flexibility is thus allowed in the application.

Monitoring and Control Equipment for the Monitoring and Correction of the Loading Operation
It is possible to use optical image-recognition systems, for example, for the monitoring and control of the loading operation. For example, these systems may record the precise position of the supplied baggage item, and accordingly align the gripping tools and the robot. The stacking operation into the loading device is also monitored by the optical image recognition, in order to detect errors in the unloading of the baggage items and to initiate remedial measures.

It has to be possible for an operator to intervene both in the correction of loading errors and for the semi-automatic loading in the case of relatively complex baggage items or in the case of relatively complex stacking operations. This intervention takes place in such a way that no direct access into the loading station is necessary since otherwise, for safety reasons, the station would have to be initially switched off, thus presenting a time problem. This can be achieved, for example, by a control system which is based on virtual reality technologies and in the case of which, through an image-recognition system, the loading situation is visualized in 3D and real time and the operator can carry out control and correction operations without direct manual intervention.

Transporting System for the Loading Device
The loading device is fed to the individual loading stations at the correct times through a transporting system, in accordance with the assignment of baggage items and loading devices (Step 3 of the process). This transportation may take place, for example, through a conveying belt or a rail-bound transporting vehicle on which the loading device is positioned.

In the exemplary embodiment illustrated in FIGS. 2 and 3, the various loading stations for the various baggage categories are combined into "loading islands". In such an embodiment, 5 flight destinations, for example, would be assigned to one loading island. The loading device required for these flights would be introduced into the associated transporting system and then guided past the loading stations. The sorting of the baggage items takes place in such a way that it is only baggage items for the assigned flights which are transported to the loading island. The baggage items are then assigned to the appropriate handling station in accordance with their category, for example hard-sided suitcases or backpacks.

Within the dynamic intermediate storage device, the baggage items are initially stored and then discharged to the handling equipment when the loading device assigned to the flight destination thereof has likewise arrived at the handling station. The handling stations are expediently disposed in such a way that the heavy and hard baggage items are loaded initially in the first stations approached by the loading device.

We claim:

1. In an airport including a check-in region, a baggage area and a baggage-conveying facility conveying baggage from the check-in region to the baggage area to be transported for loading into aircraft, the baggage-conveying facility having at least one supply station, at least one collecting station, a conveying device, a control device, and a measuring device for determined characteristic variables of supplied baggage items, flight destination and travel class,
   a configuration for the automated conveying, sorting and loading of baggage items, comprising:
      a computer connected to the measuring device, said computer using the measured characteristics of supplied baggage items to calculate a loading scheme for a given loading device; and
      a loading station with loading tools for automated loading of bags into loading devices;
      said computer generating control commands delivered to the conveying device and control commands delivered to said loading station from said loading scheme.

2. The configuration according to claim 1, wherein for calculating said loading scheme, said characteristic variables are selected from the group consisting of weight, shape, volume and consistency.

3. The configuration according to claim 1, wherein said loading tools for automated loading of bags into loading devices include at least one of robots and gripping tools.

4. The configuration according to claim 1, including an automated transporting apparatus for transferring loading devices to the loading stations.

5. The configuration according to claim 1, wherein said computer includes a first computing unit connected to the measuring device, said first computing unit using the measured characteristics of supplied baggage items to calculate said loading scheme, and a second computing unit for receiving said loading scheme and generating control commands delivered to the conveying device and control commands delivered to said loading station.

6. A process for the automated conveying, sorting and loading of baggage items in airports having a baggage-conveying facility conveying the baggage from a check-in region to a baggage area, from where it is transported for loading into aircraft, which comprises:
   in a first step, recording and registering data including flight destination, travel class, weight, shape, volume and consistency for each baggage item;
   in a second step, entering the recorded baggage data into a computer system (packing computer) dividing the baggage items into predetermined classes and determining an optimum assignment to loading devices in accordance with classification and flight destination;
   in a third step, bringing the baggage items to loading stations for loading in accordance with the assignment; and
   in a fourth step, substantially automatically loading the baggage items into the loading devices with robots and at least one of gripping tools and mechanical loading apparatuses.

7. The process according to claim 6, which further comprises carrying out the loading of the baggage items in accordance with a classification of weight and consistency by placing at least one of hard and heavy baggage items in the vicinity of the bottom and stacking soft and lightweight baggage items thereon.

8. The process according to claim 6, which further comprises carrying out the loading of the baggage items in accordance with their assignment to baggage classes and flight destinations.

9. The process according to claim 8, which further comprises carrying out the assignment of the baggage items to baggage classes and flight destinations with a computer controlling a baggage-conveying facility and transferring data to the baggage-conveying facility.

10. The process according to claim 6, which further comprises recording and storing data relating to destination and properties of a baggage item during check-in of a relevant passenger.

11. The process according to claim 10, which further comprises selecting the data relating to properties of the baggage item from the group consisting of weight, volume, shape and consistency.

12. The process according to claim 6, which further comprises carrying out recordation of volume, contour and consistency of the baggage items automatically without human involvement.

13. The process according to claim 10, which further comprises directly storing the recorded data in a computer of a baggage-conveying facility.

14. The process according to claim 12, which further comprises directly storing the recorded data in a computer of a baggage-conveying facility.

15. The process according to claim 13, which further comprises storing the recorded data on data carriers provided on the baggage items, and automatically detecting the data carriers during passage through a loading path with optical or electronic reader units provided for the automatically detection, to control a loading operation.

16. The process according to claim 14, which further comprises storing the recorded data on data carriers provided on the baggage items, and automatically detecting the data carriers during passage through a loading path with optical or electronic reader units provided for the automatically detection, to control a loading operation.

17. The process according to claim 6, which further comprises monitoring a loading operation of the baggage items with optical image-recognition systems detecting and correcting a respective position of the baggage items, if required, with mechanical tools.

18. The process according to claim 6, which further comprises monitoring a loading operation of the baggage items with optical image-recognition systems detecting and correcting a respective position of the baggage items, if required, with gripping tools.

19. The process according to claim 17, which further comprises indicating the respective position of the baggage items with the image-recognition system upon an occurrence of disruptions, if required, and controlling use of the mechanical tools with three-dimensional visualization, by an operator to eliminate disruptions.

20. The process according to claim 17, which further comprises indicating the respective position of the baggage items with the image-recognition system upon an occurrence of disruptions, if required, and controlling use of the gripping tools with three-dimensional visualization, by an operator to eliminate disruptions.

\* \* \* \* \*